United States Patent
Ash et al.

(10) Patent No.: US 7,606,953 B2
(45) Date of Patent: Oct. 20, 2009

(54) METHOD AND SYSTEM FOR GENERATING CONTEXT-AWARE CONTENT FROM SOURCE CONTENT ASSOCIATED WITH A COMPUTING DEVICE

(75) Inventors: Marcus A. Ash, Redmond, WA (US); Udiyan I. Padmanabhan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 382 days.

(21) Appl. No.: 11/067,122

(22) Filed: Feb. 25, 2005

(65) Prior Publication Data

US 2006/0212621 A1   Sep. 21, 2006

(51) Int. Cl.
*G06F 13/12* (2006.01)
*G06F 3/00* (2006.01)

(52) U.S. Cl. .......................... 710/62; 715/700
(58) Field of Classification Search ............. 710/62, 710/64, 72; 715/700
See application file for complete search history.

(56) References Cited

U.S. PATENT DOCUMENTS

2002/0141582 A1 * 10/2002 Kocher et al. ............... 380/201
2004/0043758 A1 * 3/2004 Sorvari et al. .............. 455/414.1
2006/0031749 A1 * 2/2006 Schramm et al. ........... 715/500.1
2007/0033419 A1 * 2/2007 Kocher et al. ............... 713/193

* cited by examiner

*Primary Examiner*—Henry W. H. Tsai
*Assistant Examiner*—Hyun Nam
(74) *Attorney, Agent, or Firm*—Merchant & Gould; Ryan T. Grace (57) ABSTRACT

A computing device receives source content and output characteristics associated with a target output device. The computing device formats the source content into multiple versions of context-aware content corresponding to specific output characteristics of the target output device. The computing device stores the multiple versions of the context-aware content in corresponding output characteristic content containers. The content containers are filtered such that only the versions of the context-aware content that correspond to the output capabilities of the target output device are made accessible to the user. The user is presented with a single namespace that is associated with the context-aware versions of the content. When the namespace is selected, the appropriate version of the context-aware content is executed based on the output characteristics of the target output device such that an optimal user experience is achieved.

11 Claims, 6 Drawing Sheets

METHOD AND SYSTEM FOR GENERATING CONTEXT-AWARE CONTENT FROM SOURCE CONTENT ASSOCIATED WITH A COMPUTING DEVICE

BACKGROUND

Synchronization, capture and transfer protocols allow content to be transferred between computing devices. The computing devices negotiate a one-to-one mapping transfer relationship between types of content that the different devices support. The protocols do not consider different usage contexts for the transferred content. For example, audio content may be enjoyed on headphones or in surround sound theaters, and video and image content may be viewed on a portable device or a widescreen plasma television. Unfortunately, downloaded content adapted for headphones will not sound optimum on a surround sound system. Likewise, an image adapted for a low resolution portable device will not look clear on a high resolution digital widescreen television.

SUMMARY

The present disclosure is directed to a method and system for generating context-aware content from source content associated with a computing device. The content may be generated within a computing device for local use or transferred between different computing devices. The content may be associated with any object in a computing system environment that can be associated with a specific output context.

The computing device receives source content and a capability profile associated with a target output device. The capability profile includes device capabilities and output characteristics associated with the target output device. The device capabilities identify the types of content supported by the target output device. The output characteristics identify the types of output supported by the target output device. The output characteristics define a mapping between the source content and the context-aware content.

The computing device formats the source content into context-aware content for use with a specific output characteristic of the target output device. Different versions of the context-aware content may be tailored for each output characteristic supported by the target output device. The computing device organizes the context-aware content files into corresponding output characteristic content containers. Each content container stores context-aware content files associated with a specific output characteristic of the target output device. Each content container also maintains a single metadata namespace mapping.

The content containers are filtered such that only the context-aware content files that correspond to the output capabilities of the target output device are made available to the user. The user is presented with a single set of identification data that is associated with the context-aware versions of the content file. When a content file is selected, the appropriate version of the context-aware content is executed based on the output characteristics of the target output device such that an optimal user experience is achieved.

In accordance with one aspect of the invention, source content and a capability profile associated with a target output device are retrieved. The capability profile describes output characteristics of the target output device. The source content is formatted into the context-aware content based on the capability profile. Each version of the context-aware content is formatted to be compatible with an output characteristic of the target output device. Each version of the context-aware content is stored in a corresponding content container. Each content container is associated with an output characteristic of a computing device. The current output characteristic of the target output device is determined. The version of the context-aware content is retrieved from the content container that corresponds to the current output characteristic of the target output device. These and other aspects will be appreciated in light of the disclosure herein.

DETAILED DESCRIPTION OF THE PREFERRED EMBODIMENT

The present disclosure is directed to a method and system for generating context-aware content from source content associated with a computing device. The computing device receives source content and a capability profile associated with a target output device. The capability profile includes device capabilities and output characteristics associated with the target output device. The computing device formats the source content into context-aware content for use with a specific output characteristic of the target output device. Different versions of the context-aware content may be tailored for each output characteristic supported by the target output device. The computing device organizes the context-aware content files into corresponding output characteristic content containers. Each content container stores the context-aware content files associated with a specific output characteristic of the target output device.

The content containers are filtered such that only the context-aware content files that correspond to the output capabilities of the target output device are accessible. A user is presented with a single namespace that is associated with the context-aware versions of the content file. When the content file is selected, the appropriate version of the context-aware content is executed based on the output characteristics of the target output device such that an optimal user experience is achieved.

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
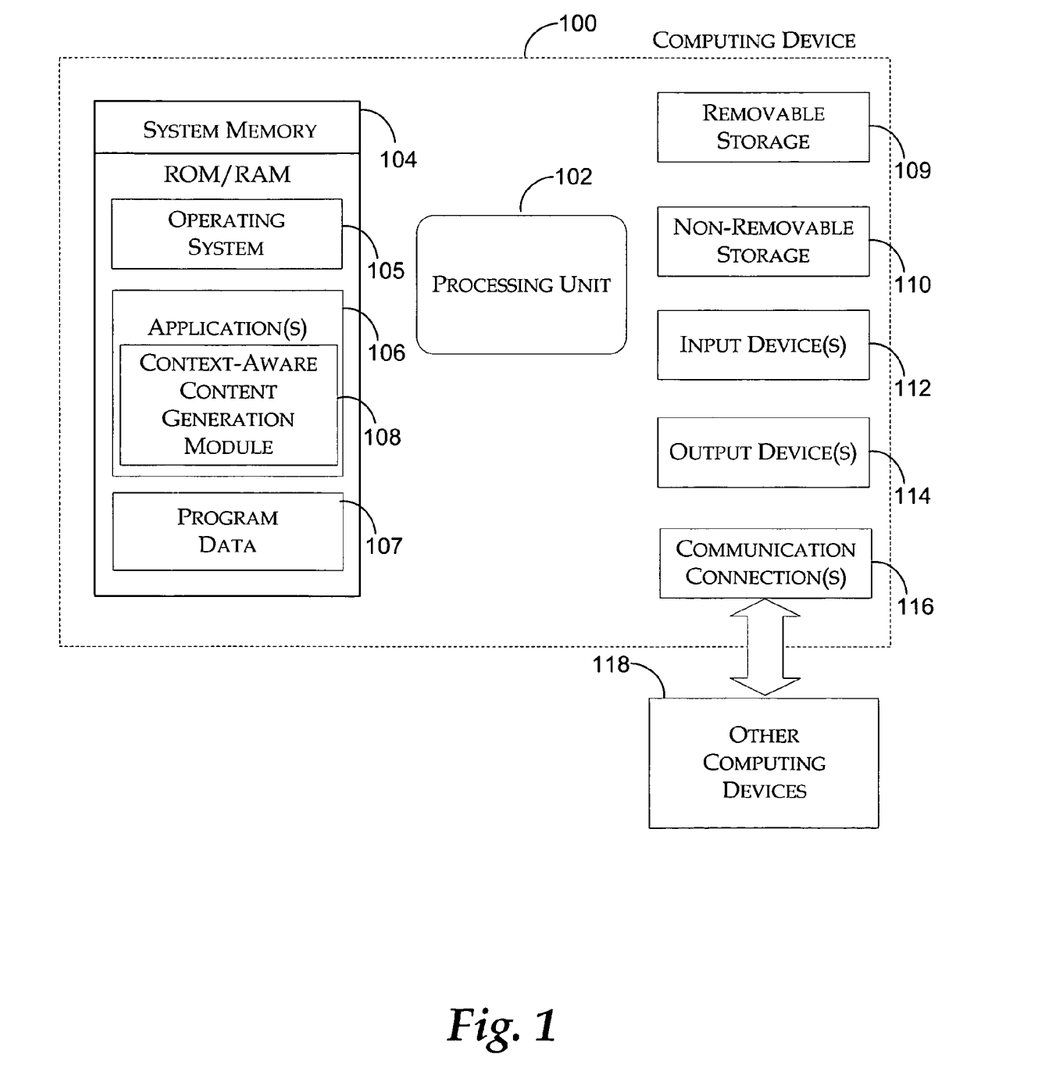
FIG. 1 illustrates a computing device that may be used according to an example embodiment of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A context-aware content generation module 108, which is described in detail below with reference to FIGS. 3-6, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
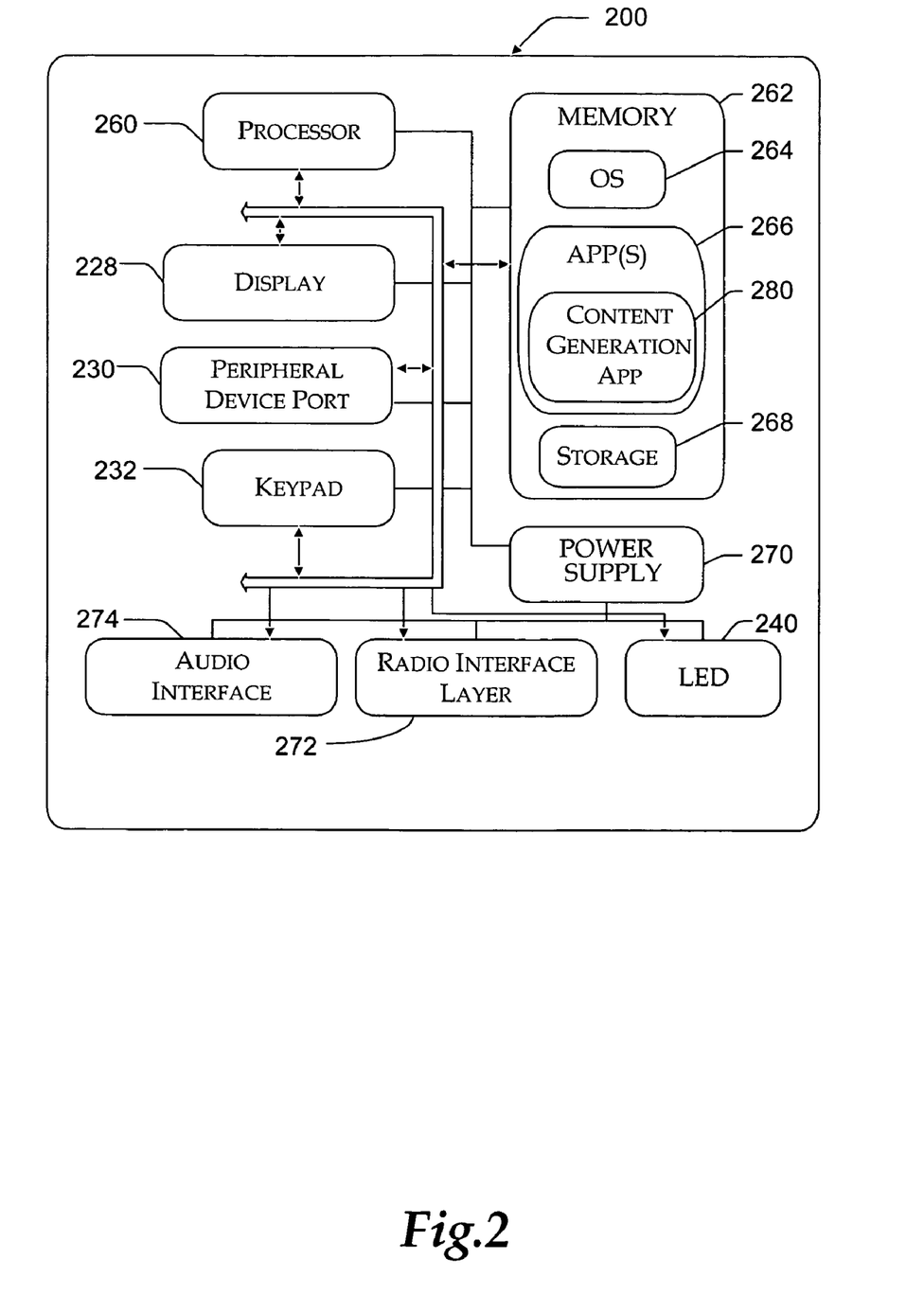
FIG. 2 illustrates an exemplary mobile device that may be used in one exemplary embodiment of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. Mobile computing device 200 includes a processor 260, memory 262, a display 228, and a keypad 232. Memory 262 generally includes both volatile memory (e.g., RAM) and non-volatile memory (e.g., ROM, flash memory, or the like). Mobile computing device 200 includes an operating system 264, such as the Windows CE operating system from the Microsoft Corporation of Redmond, Wash. or any other operating system, which is resident in memory 262 and executes on processor 260. Keypad 232 may be a push button numeric dialing pad (such as on a typical telephone), or a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, email programs, scheduling programs, PIM (personal information management) programs, word processing programs, spreadsheet programs, Internet browser programs, and so forth. Mobile computing device 200 also includes non-volatile storage 268 within memory 262. Non-volatile storage 268 may be used to store persistent information which should not be lost if mobile computing device 200 is powered down. Applications 266 may use and store information in storage 268, such as e-mail or other messages used by an e-mail application, contact information used by a PIM, appointment information used by a scheduling program, documents used by a word processing application, and the like.

Mobile computing device 200 includes a power supply 270, which may be implemented as one or more batteries. Power supply 270 might further include an external power source, such as an AC adapter or a powered docking cradle that supplements or recharges the batteries.

Mobile computing device 200 is shown with two types of external notification mechanisms: an LED 240 and an audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes a radio interface layer 272 that performs the function of transmitting and receiving communications, such as radio frequency communications. Radio interface layer 272 facilitates wireless connectivity between the mobile computing device 200 and the outside world, via a communications carrier or service provider. Transmissions to and from radio interface layer 272 are conducted under control of the operating system 264. In other words, communications received by radio interface layer 272 may be disseminated to application programs 266 via operating system 264, and vice versa. In one embodiment, applications 266 further include an application 280 for generating context-aware content from source content associated with a computing device is further discussed below in conjunction with FIGS. 3-6.

Figure 3:
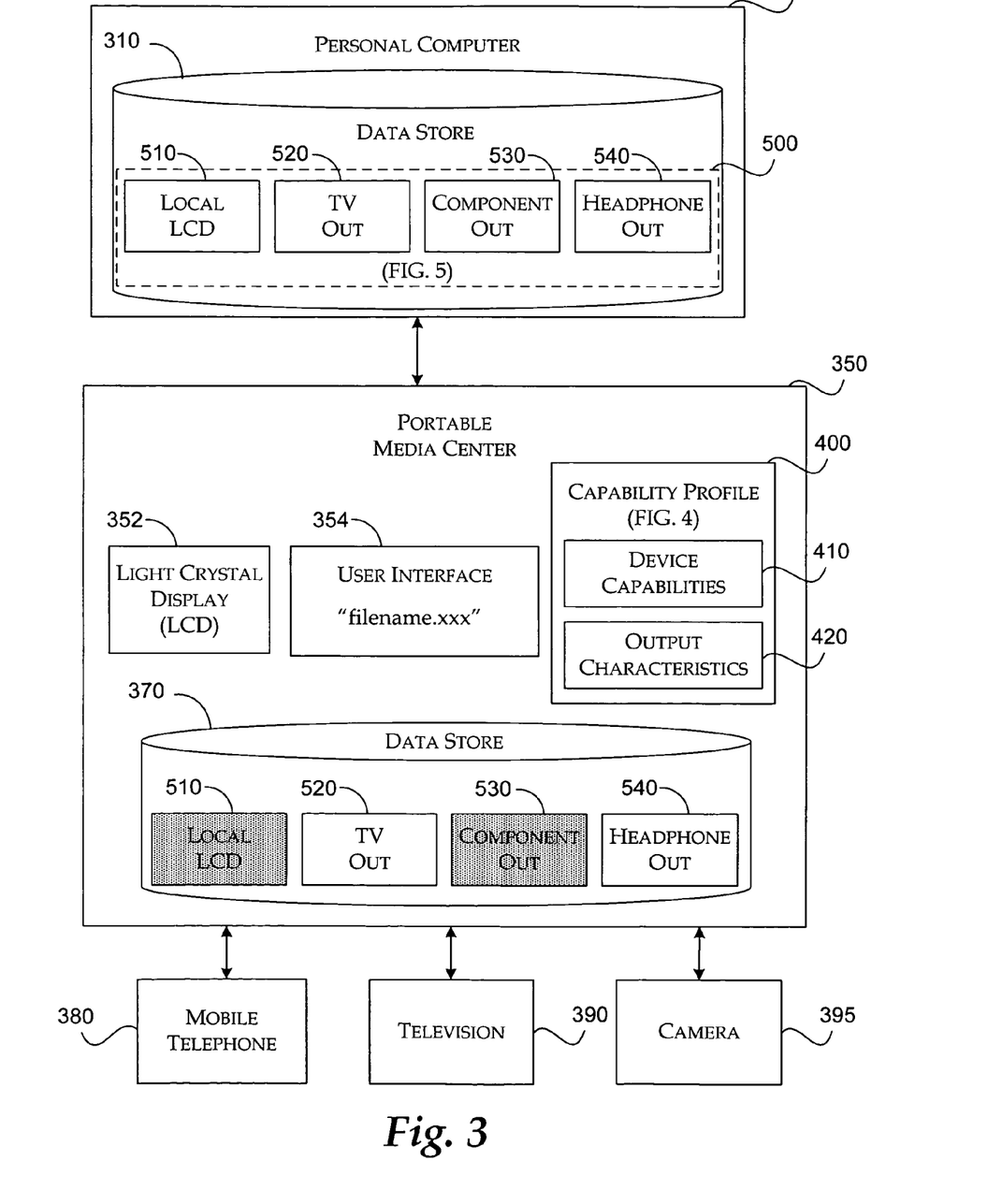
FIG. 3 illustrates a block diagram of a system for generating context-aware content from source content associated with a computing device, in accordance with at least one feature of the present invention.

Generating Context-Aware Content from Source Content Associated with a Computing Device FIG. 3 illustrates a block diagram of a system for generating context-aware content from source content associated with a computing device. The context-aware content may be generated within a computing device for local use or transferred between several different computing devices. In one embodiment, context-aware content may be generated within one computing device, such as personal computer 300, and transferred to a target output device, such as portable media center 350. The source content may be associated with any object in a computing system environment that can be associated with a specific output context. Personal computer 300 may be coupled to portable media center 350 through either a wired or wireless connection. Portable media center 350 may be further coupled to peripheral devices, such as mobile telephone 380, television 390, and camera 395.

Personal computer 300 includes data store 310. Data store 310 includes output characteristic content containers 500. In one embodiment, output characteristic content containers 500 may include local liquid crystal display (LCD) content container 510, television output content container 520, component output content container 530, and headphone output content container 540. Output characteristic content containers 500 are described in detail below with reference to FIG. 5.

Figure 4:
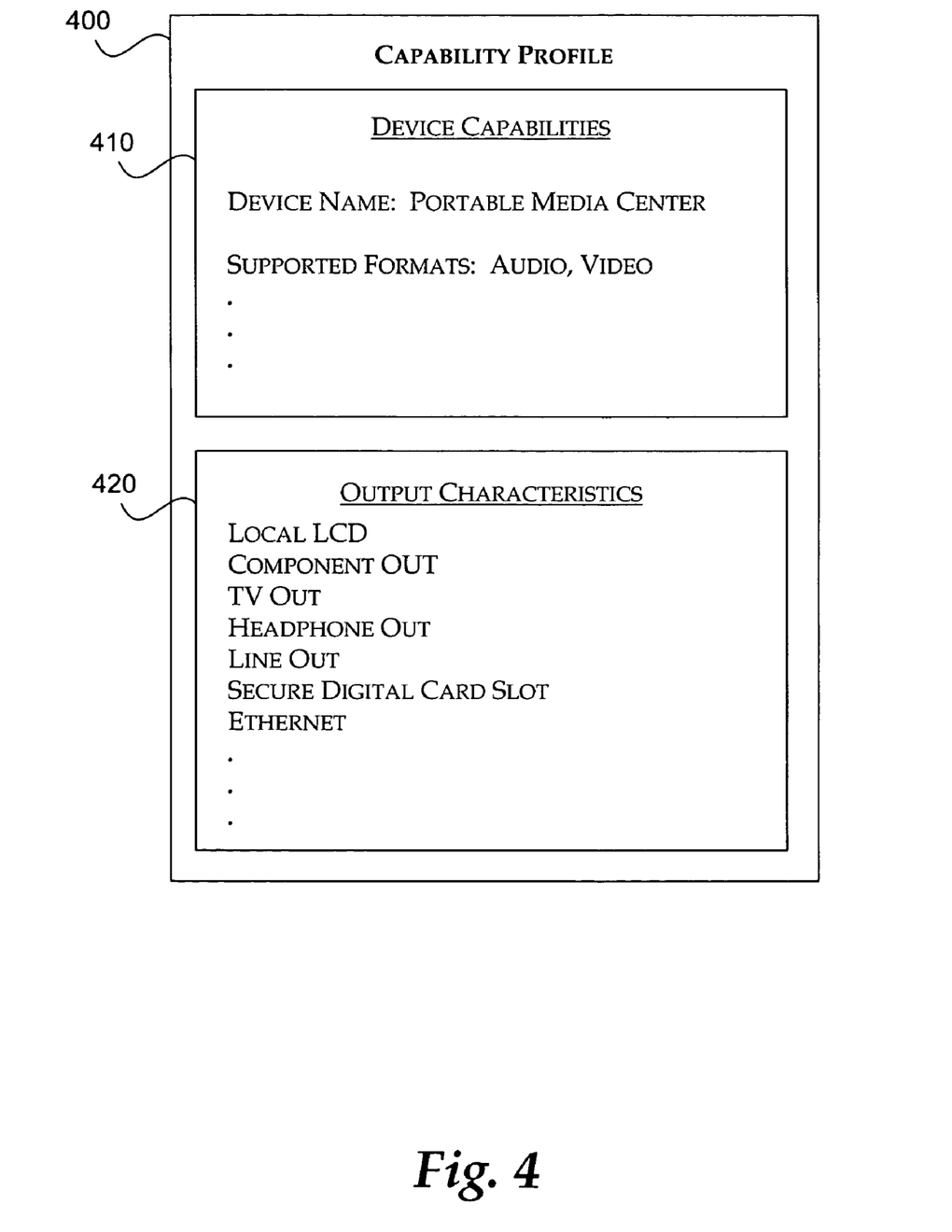
FIG. 4 illustrates an exemplary capability profile, in accordance with at least one feature of the present invention.

Portable media center 350 includes LCD 352, user interface 354, capability profile 400, and data store 370. FIG. 4 illustrates an exemplary capability profile, such as capability profile 400. Capability profile 400 includes device capabilities 410 and output characteristics 420. Device capabilities 410 identify the type of content supported by portable media center 350. For example, portable media center 350 supports audio and video associated with a particular media application. Output characteristics 420 identify the types of output supported by portable media center 350. For example, portable media center 350 may output content to a local LCD, a peripheral component, a television, a headphone set, a multipurpose output line, a secure digital card slot, and an Ethernet, to name a few. Output characteristics 420 define a namespace mapping between source content and context-aware content, which is described in detail below.

Referring back to FIG. 3, portable media center 350 connects to personal computer 300, and transfers the source content and capability profile 360 to personal computer 300. Personal computer 300 processes capability profile 360 and generates context-aware content from the source content. For example, personal computer 300 may include several objects such as two video files (e.g., Video #1 and Video #2), one image file (Image #1), and three music files (e.g., Song #1, Song #2, and Song #3). Personal computer 350 formats the image, video and music files to be compatible with the corresponding output characteristics of portable media center 350. Instead of creating one content file that supports different output characteristics, multiple context-aware content files are tailored for each output experience supported by portable media center 350. In one embodiment, the context-aware content is generated before portable media center 350 requests the content from personal computer 300.

Figure 5:
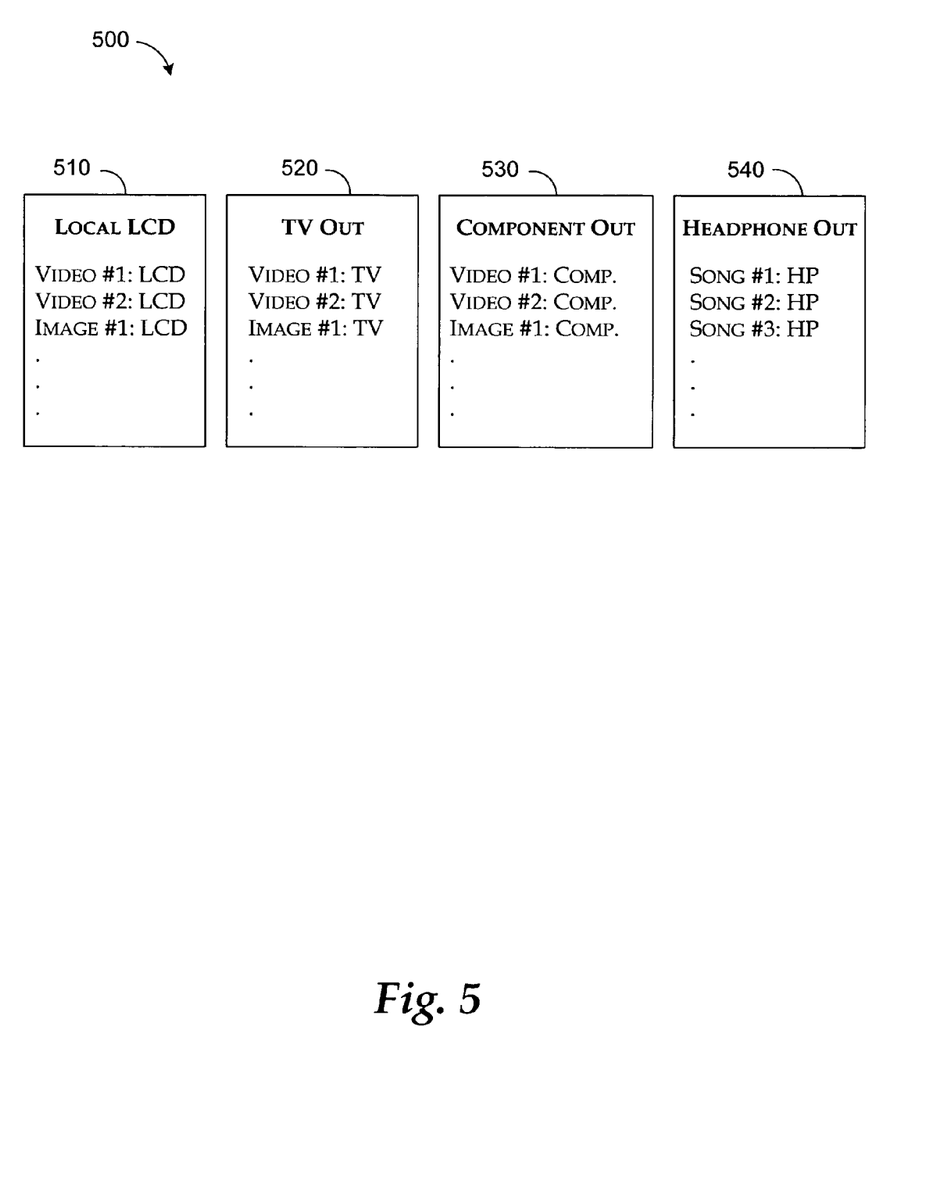
FIG. 5 illustrates object files formatted for specific output characteristics and stored in corresponding output characteristic content containers, in accordance with at least one feature of the present invention.

FIG. 5 illustrates context-aware files that are formatted for specific output characteristics and stored in corresponding output characteristic content containers. In one embodiment, an output characteristic may be associated with a specific viewing or listening experience. For example, video and image files are each formatted for display on local LCD 352, television 390, and a peripheral component that may be connected to portable media center 350. Song files may be formatted for output to headphones connected to portable media center 350. Personal computer 300 organizes the different versions of the context-aware content into output characteristic content containers 500. Each content container may be associated with a specific output characteristic. Specifically, the video and image files that are formatted for display on local LCD 352 are stored in local LCD content container 510; the video and image files that are formatted for display on television 390 are stored in television content container 520; the video and image files that are formatted for display on a peripheral component are stored in component content container 530; and the song files that are formatted for output to headphones are stored in headphones content container 540. In one embodiment, content containers 500 are stored in the underlying logical architecture of the personal computer's file system.

Each content container may also maintain a single metadata namespace mapping. For example, a user may download a video file for playback on personal computer 300. Two copies of the video file are created for transfer to portable media center 350. One copy of the video file may be optimized for display on LCD 352 of portable media center 350. Another copy of the video file may be optimized for playback on television 390. The user is presented with a one namespace corresponding to the downloaded video file in user interface 354. When the user selects the namespace to playback the video file on portable media center 350, the appropriate context-aware version of the video file is executed based on the output characteristics of the target output device, as described in further detail below.

The context-aware content is organized within personal computer 300 such that the content may be located in a specific content container that is transferred to portable media center 350. A logical representation in the file system of personal computer 300 facilitates the location and transfer process such that the logical representation is hidden from the user. In one embodiment, the logical representation is a tag in the context-aware content file. The mapping of the context-aware content into output characteristic content containers 500 allows personal computer 300 and portable media center 350 to filter the content containers on portable media center 350. By filtering the content containers, only the context-aware content that corresponds to the output capabilities of portable media center 350 is displayed on user interface 354.

Referring back to FIG. 3, each context-aware version of the content file is optimized for a specific consumption scenario. For example, one file may be formatted for display on television 390, one file may be formatted for display on local LCD 352 of portable media center 350, and one file may be displayed on a peripheral component such as a monitor. The different versions of the context-aware content are stored in corresponding output characteristic content containers 500. A user is not presented with all of the different versions of the context-aware content when scanning through the file system of personal computer 300. Instead, the user is presented with a single namespace (e.g., filename.xxx) that may be associated with the multiple context-aware versions of the content.

Single metadata namespace mapping and content container filtering allow multiple context-aware versions of a content file to be represented by a single set of identification data. Metadata management problems may arise if content with the same metadata identification characteristics remains the same even when the content is optimized for different scenarios. The problem may be resolved by filtering the content containers based on the desired output experience. Personal computer 300 may archive multiple versions of the context-aware content for subsequent transfer to portable media center 350. Data store 310 stores the identification information associated with the content to enable searching by user interface software.

Personal computer 300 aggregates output characteristic content containers 500 and transfers the content containers to portable media center 350 through an established protocol. Personal computer 300 and portable media center 350 communicate which content container is being sent through the protocol such that portable media center 350 may establish a set of output characteristic content containers to filter. In one embodiment, portable media center 350 organizes the structure of data store 370 to maintain the same content container structure as personal computer 300.

User interface 354 determines the current output characteristic settings of portable media center 350. In one embodiment, the current output characteristics are determined from the organization of output characteristic content containers 500 in data store 370. For example, user interface 354 may determine that LCD 352 is the primary visual display function for portable media center 350 and that the headphones are the primary audio output function. In one embodiment, portable media center 350 filters data store 370 to make available to the user only content containers 500 that correspond to the current output characteristic settings. In another embodiment, the content containers are filtered on personal computer 300. User interface 354 may access the versions of the context-aware content that map to a current output characteristic of portable media center 350. The user then selects a namespace in user interface 354. Portable media center 350 accesses the appropriate content container based on the current output characteristic settings. Portable media center 350 then identifies the output destination and executes the proper version of the context-aware content file to achieve an optimal user experience.

For example, portable media center 350 may display the content on local LCD 352. The underlying playback architecture associated with portable media center 350 retrieves the version of the context-aware content file that is formatted for display on local LCD 352 from local LCD content container 510. Both personal computer 300 and portable media center 350 may filter the content containers such that the context-aware content that is formatted for display on LCD 352 may be separated from other versions of the context-aware content associated with the same source content.

In another embodiment, portable media center 350 may be arranged to display content on television 390. User interface 354 lists different video content available on portable media center 350. User interface 354 filters the content containers to display only the context-aware content files that are formatted for use with television 390. For example, only content containers 520, 540 are formatted for use with television 390. The content containers that are irrelevant to television 390 are shown in gray tones to indicate that they are still stored in data store 370 but are not accessible.

In another embodiment, a user desires to transfer a text document object from portable media center 350 to mobile telephone 380. Mobile telephone 380 transfers a capability profile to portable media center 350 such that portable media center 350 is provided with the device capabilities and output characteristics associated with mobile telephone 380. For example, portable media center 350 may be informed of the size of the display on mobile telephone 380. Portable media center 350 may also be informed that mobile telephone 380 includes a video graphics array (VGA) output capability for use with a particular video projection device. Portable media center 350 formats the text document objects into two different context-aware content versions: one for display on mobile telephone 380 and one that is VGA-compatible.

Portable media center 350 locates the content containers associated with the output characteristics of mobile telephone 380. For example, two different content containers may be located in the file system of portable media center 350: one that includes files that are VGA-compatible, and another that includes files that are optimized for local display on mobile telephone 380. The two different context-aware content versions are stored in the corresponding content containers. Portable media center 350 then transfers both content containers to mobile telephone 380.

When a user selects the namespace associated with the text document object while connected to the projection device, mobile telephone 380 determines that a VGA-compatible monitor is connected to the target output device. Thus, mobile telephone 380 retrieves the context-aware file that is formatted for use with the VGA-capable projection device from the corresponding content container. If only the local display on mobile telephone 380 is available for output (i.e., no external monitors are connected), the context-aware file that is formatted for local display is retrieved from the appropriate content container in the file system of mobile telephone 380.

In another embodiment, the invention may be implemented internally within one computing device, such as portable media center 350. For example, camera 395 may be arranged to capture image files that are each 12 megapixels. One image file may be provided with the namespace "filename.jpg". A memory card associated with camera 395 may be used to transfer the image file to portable media center 350. Portable media center 350 attempts to acquire the image file. As part of the acquisition process, portable media center 350 determines which image files are stored on the memory card. For example, there may be one hundred different 12 megapixel image files stored on the memory card.

The current output capability of portable media center 350 is then determined. In one example, the display resolution of local LCD 352 of portable media center 350 may be 640×480 pixels. A 12 megapixel file has a much larger resolution. Thus, the 12 megapixel image is beyond the capabilities of local LCD 352. To overcome this problem, portable media center 350 formats each 12 megapixel file for use with a 640×480 resolution display such that two context-aware copies of each image file are stored in a corresponding content container in portable media center 350.

Portable media center 350 may include multiple content containers. One content container may include object files that may be used with a computing device that supports high resolution display. The name of the file indicates the corresponding output capability (e.g., filename_lg.jpg). Another content container may include object files that are formatted for use with local LCD 352 of portable media center 350. The name of the file reflects the output capability of the file (e.g., filename_sm.jpg).

A database entry may have the namespace "filename.jpg". Additional information in the database associates the database entry with specific output capabilities. For example, filename.jpg links to filename_sm.jpg when the namespace is selected for output to local LCD 352. When a user selects the namespace on user interface 354 to view the image file on local LCD 352, data store 370 is informed that filename.jpg has been selected for viewing on local LCD 350. Thus, filename_sm.jpg is retrieved from data store 370. Likewise, filename.jpg links to filename_lg.jpg when the namespace is selected for output to a high resolution display. For example, a user may select the namespace from user interface 354 for display on personal computer 300. Portable media center 350 recognizes that it is connected to personal computer 300 that includes a high resolution display. Thus, filename_lg.jpg is retrieved from the database and forwarded to personal computer 300.

Figure 6:
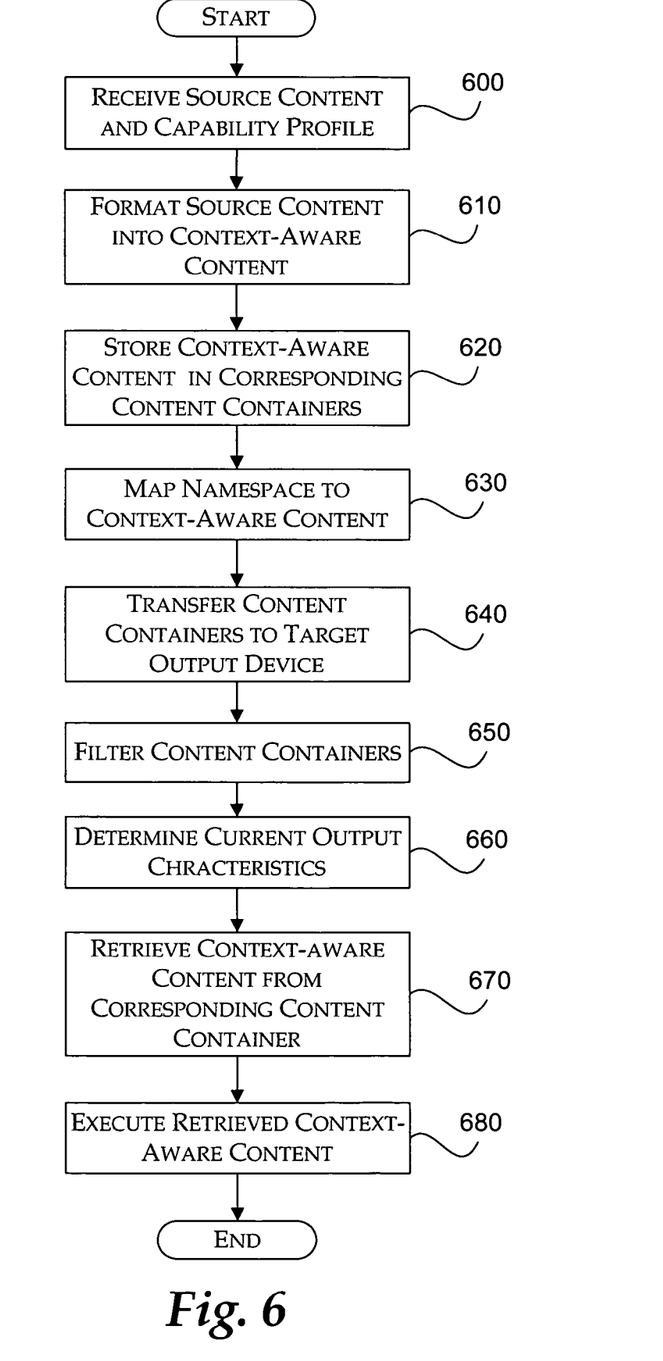
FIG. 6 illustrates an operational flow diagram illustrating a process for generating context-aware content from source content associated with a computing device, in accordance with at least one feature of the present invention.

FIG. 6 illustrates an operational flow diagram illustrating a process for generating context-aware content from source content associated with a computing device. The process begins at a start block where a user desires to generate and transfer context-aware content to a target output device.

The source content and a capability profile are received at block 600. The capability profile includes device capabilities and output characteristics associated with the target output device. In one embodiment, the source content is a high quality master copy of the content. For example, the source content may be a video file that is formatted for use with a high definition television or a surround sound stereo system. The source content may be obtained when the target output device connects to the computing device. The source content may also be loaded to the computing device by any means for transferring content (e.g., a server, a memory device, etc.). The source content may also be produced by the computing device.

Proceeding to block 610, the source content is formatted into context-aware content based on the output characteristics enumerated in the capability profile. Each version of the context-aware content is formatted to be compatible with an output characteristic of the target output device. The context-aware versions of the content may include less than all of the information included in the source content. Some bits of information are not included in the context-aware copy of the content because the bits are not related to content output. For example, a master copy of the source content may be exemplified by a 12 megapixel image. When a 640×480 resolution version of the content is generated, many of the bits are not transferred because they are not necessary for displaying the context-aware version of the content.

Advancing to block 620, each version of the context-aware content is stored in a corresponding content container. Each content container is associated with a particular output characteristic of a computing device. For example, all content that is formatted for a 640×480 megapixel display is stored in the same content container.

Transitioning to block 630, a single metadata namespace is mapped to the different versions of the context-aware content. The namespace presents the user with a unified view of the multiple versions of the context-aware content such that the content may be supplied on demand. For example, a user interface displays a namespace (e.g., "filename.xxx") to the user. The namespace is linked to the corresponding context-aware versions of the file that are formatted for different output characteristics and stored in different content containers.

Continuing to block 640, the content containers are transferred from the computing device to the target output device through an established protocol. In one embodiment, only the content containers that correspond to output capabilities of the target output device are transferred. Moving to block 650, the content containers are filtered such that only the content containers that include context-aware content that is compatible with the target output device are made accessible. In one embodiment, a user interface may determine that the only output capability of the target output device is a particular display resolution (e.g., 640×480 pixels). The content containers are filtered such that only the content container corresponding to the 640×480 display resolution is accessible to the user.

Proceeding to block 660, the current output characteristics of the target output device are determined. The current output characteristics may be determined from available local devices, peripherally connected devices, and the content containers that have been made accessible.

Advancing to block 670, a context-aware version of the content file corresponding to the determined current output characteristics of the target output device is retrieved from the corresponding content container when the namespace is selected. Transitioning to block 680, the retrieved version of the context-aware content is executed on the target output device such that an optimal user experience is achieved. Processing then terminates at an end block.

The process described does not necessarily occur in real time. For example, when a target output device first connects to a computing device, the computing device stores the output characteristics of the target output device. Any time that the computing device receives a subsequent file (e.g., a video file downloaded from the Internet), the computing device automatically generates the appropriate content that is formatted for the target output device. The computing device does not wait for the target output device to connect. Thus, there is no delay in transferring the appropriate content containers to the target output device.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method that generates context-aware content from source content associated with a computing device, comprising:
   providing a target output device in communication with a plurality of output peripheral devices configured to cause a sensory output of media content according to output characteristics of the output peripheral devices;
   obtaining source content of the media content and a capability profile, wherein the capability profile identifies output characteristics of each of the output peripheral devices in communication with the target output device;
   formatting the source content into versions of context-aware content based on the capability profile, wherein each version of the context-aware content is formatted to correspond to the output characteristics of a corresponding output peripheral device in communication with the target output device;
   storing each version of the context-aware content in a separate corresponding content container that is specific to the corresponding output peripheral device;
   determining current output characteristics of an output peripheral selected to cause the sensory output of the media content;
   retrieving the corresponding version of the context-aware content from the corresponding content container that is specific to the corresponding output peripheral selected to cause the sensory output of the media content; and
   executing the corresponding version of the context-aware content on the corresponding output peripheral selected to cause the sensory output of the media content.

2. The computer-implemented method of claim 1, further comprising mapping a same namespace to each version of the context-aware content, wherein the corresponding version of the context-aware content is retrieved from the corresponding content container when the namespace is selected.

3. The computer-implemented method of claim 1, further comprising filtering the content containers when the selected output peripheral is selected to cause the sensory output of the media content.

4. The computer-implemented method of claim 1, wherein determining the current output characteristic further comprises identifying output peripheral devices that are currently connected to the target output device.

5. A system that generates context-aware content from source content associated with a computing device, comprising:
   a processor; and
   a memory having computer executable instructions stored thereon, wherein the computer executable instructions are configured for:
      providing a target output device in communication with a plurality of output peripheral devices configured to cause a sensory output of media content according to output characteristics of the output peripheral devices;
      obtaining source content of the media content and a capability profile, wherein the capability profile identifies output characteristics of each of the output peripheral devices in communication with the target output device;
      formatting the source content into versions of context-aware content based on the capability profile, wherein each version of the context-aware content is formatted to correspond to the output characteristics of a corresponding output peripheral device in communication with the target output device;
      storing each version of the context-aware content in a separate corresponding content container that is specific to the corresponding output peripheral device;
      determining current output characteristics of an output peripheral selected to cause the sensory output of the media content; and
      retrieving the corresponding version of the context-aware content from the corresponding content container that is specific to the corresponding output peripheral selected to cause the sensory output of the media content.

6. The system of claim 5, further comprising mapping a same namespace to each version of the context-aware content, wherein the corresponding version of the context-aware content is retrieved from the corresponding content container when the namespace is selected.

7. The system of claim 5, further comprising executing the corresponding version of the context-aware content on the corresponding output peripheral selected to cause the sensory output of the media content.

8. A computer-readable storage medium having computer-executable instructions that generate context-aware content from source content associated with a computing device, comprising:
   providing a target output device in communication with a plurality of output peripheral devices configured to cause a sensory output of media content according to output characteristics of the output peripheral devices;
   obtaining source content of the media content and a capability profile, wherein the capability profile identifies output characteristics of each of the output peripheral devices in communication with the target output device;
   formatting the source content into versions of context-aware content based on the capability profile, wherein each version of the context-aware content is formatted to correspond to the output characteristics of a corresponding output peripheral device in communication with the target output device;
   storing each version of the context-aware content in a separate corresponding content container that is specific to the corresponding output peripheral device;
   determining current output characteristics of an output peripheral selected to cause the sensory output of the media content; and
   retrieving the corresponding version of the context-aware content from the corresponding content container that is specific to the corresponding output peripheral selected to cause the sensory output of the media content.

9. The computer-readable storage medium of claim 8, further comprising mapping a same namespace to each version of the context-aware content, wherein the corresponding version of the context-aware content is retrieved from the corresponding content container when the namespace is selected.

10. The computer-readable storage medium of claim 8, further comprising executing the corresponding version of the context-aware content on the corresponding output peripheral selected to cause the sensory output of the media content.

11. The computer-readable storage medium of claim 8, further comprising filtering the content containers when the selected output peripheral is selected to cause the sensory output of the media content.

* * * * *